Figure 1:
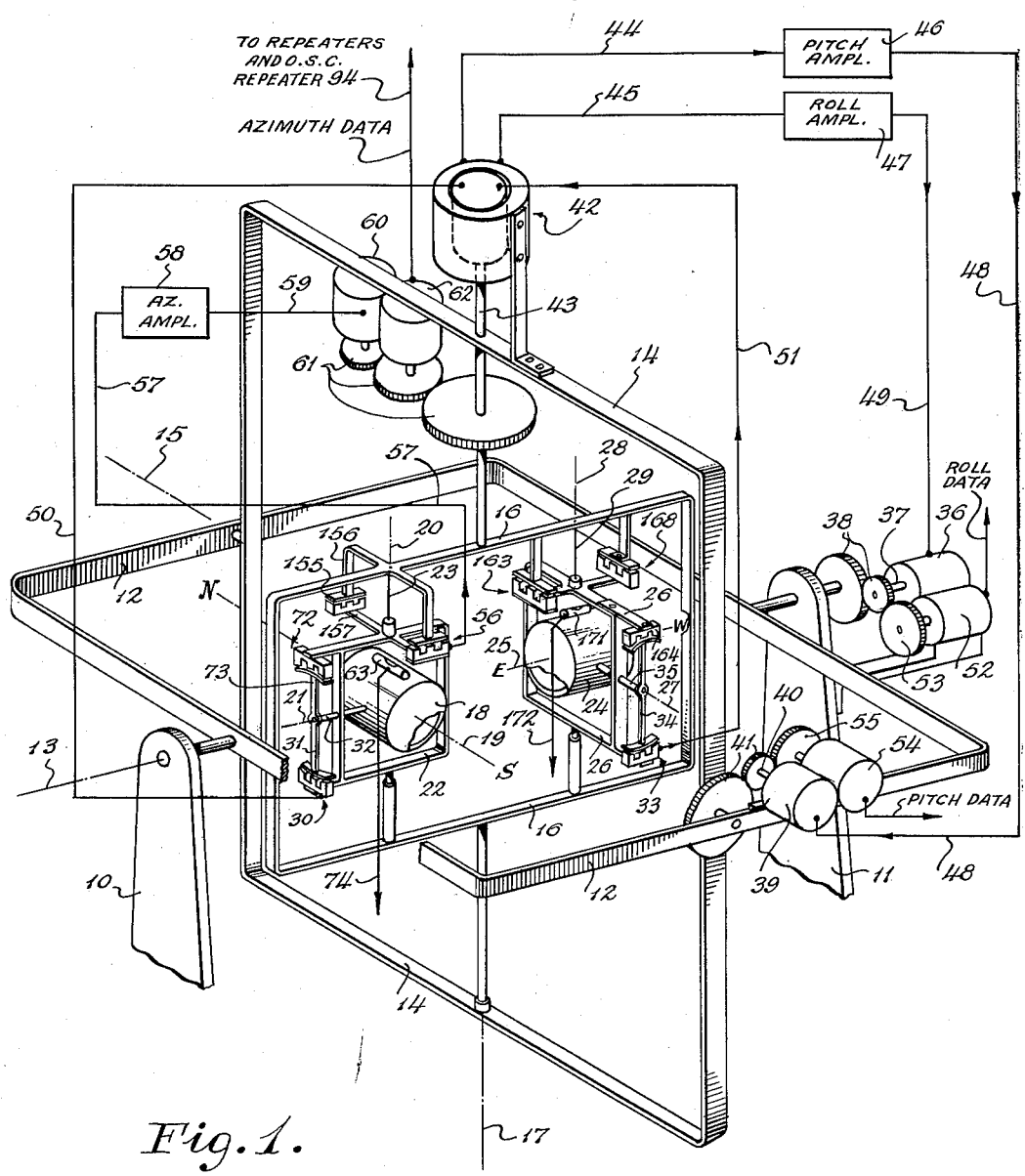

Jan. 3, 1956  V. VACQUIER ET AL  2,729,108
CONTROL SYSTEMS FOR GYROSCOPIC INSTRUMENTS
Filed Dec. 13, 1951  3 Sheets-Sheet 3
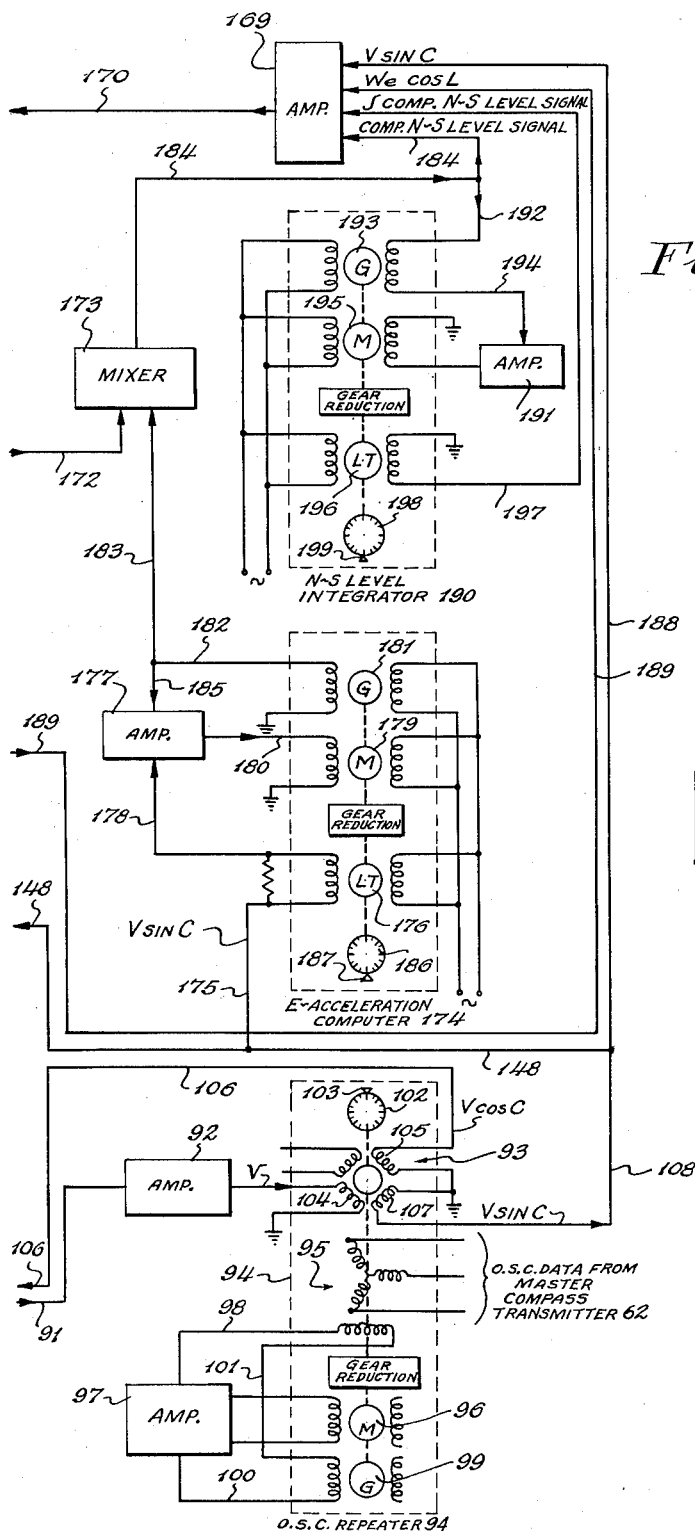
INVENTORS
VICTOR VACQUIER
ANDREW P. COPE
RICHARD PROSKAUER
BY Arthur H. Serrell
ATTORNEY

United States Patent Office 2,729,108
Patented Jan. 3, 1956

2,729,108
CONTROL SYSTEMS FOR GYROSCOPIC INSTRUMENTS

Victor Vacquier, Garden City, Andrew P. Cope, East Hempstead, and Richard Proskauer, Westbury, N. Y., assignors to Sperry Rand Corporation, a corporation of Delaware Application December 13, 1951, Serial No. 261,524

30 Claims. (Cl. 74—5.34)

This invention relates to a control system for gyroscopic instruments of the character known in the art as zenith meridian indicators and gyro compasses. The first of these noted types of instruments provides a three axis reference device for the dirigible craft on which it is mounted. Such devices define true north and the zenith and provide data of the azimuth position, roll attitude and pitch attitude of the craft, which information is useful in the navigation of the craft and for stabilization purposes. The second of the noted types of instruments provides only a single axis reference by which the position or attitude of the craft about its yaw or azimuth axis is determined. The angular motions of the craft about its athwartship, fore and aft, and yaw axes are measured by the improved instrument constructed in accordance with the present invention in terms of pitch attitude, roll attitude and heading respectively.

The sensitive element of a gyroscopic instrument controlled in accordance with the present inventive concepts includes a pair of gyros of the directional type whose rotors normally spin about horizontal axes. The frames for the respective gyroscopic rotors are independently mounted on a common support. The frames for the rotors are interconnected by a slaving means adapted to maintain the spin axes of the rotors in mutually perpendicular relation. The instrument is provided with azimuthal directivity by gravity responsive means for the meridian gyro of the sensitive element whereby its horizontal spin axis is maintained in a north-south direction due to the effect thereon of the horizontal component of the earth's rotation. The slave gyro of the sensitive element includes a frame supporting a rotor whose horizontal spin axis points in an east-west direction. Both gyros are mounted in neutral equilibrium on the common support. The frames of both gyros are levelled with the spin axes of the rotors thereof in a horizontal plane as by means including electrolytic levels providing limited substantially linear signal outputs with tilt of the frames within a range of plus or minus one-half a degree from a level condition. The support for the gyros includes an azimuth or phantom member with freedom about a vertical axis that is mounted on a platform having freedom relative to the mutually perpendicular pitch and roll axes of the craft. The azimuth member and platform are respectively positioned by an azimuth servomotor, and pitch and roll servomotors. The platform and azimuth member are effectively stabilized by a follow-up control from the sensitive element of the improved gyroscopic instrument which includes the respective servomotors. Azimuth, pitch and roll data transmitters are also operated by the respective servomotors. In the improved instrument, the rotors of the sensitive element are maintained at full operating speed regardless of the latitude of the craft. The pendulous factor provided by the gravity responsive means for the north-south directed gyro part of the sensitive element is also maintained constant. Due to these conditions, the period of the improved instrument varies with the latitude of the craft on which it is mounted. The rate of response of the instrument to disturbing accelerations remains constant at all latitudes. The gravity controllers for the sensitive element of the improved instrument are shown in the form of electrolytic levels that provide limited substantially linear outputs within a tilt range of plus or minus one-half a degree from a level condition.

One of the objects of the present invention is to provide continuous correction in azimuth and in levelling of the sensitive element of the instrument in accordance with a measurement of the craft's acceleration.

A feature of the invention resides in provision of a gyroscopic instrument of the character described with a gravity directed sensitive element that is directly corrected in accordance with a measurement of the craft's speed, course and latitude effective through a means that exerts a corresponding torque about the horizontal axis of the element.

In accordance with the invention, the north-south or meridian directed gyroscopic part of the sensitive element of the instrument is also directly corrected in azimuth in accordance with a measure of the vertical component of the earth's rotation effective through a means that exerts a corresponding torque about the longitudinal axis of the element.

Another feature of the invention resides in the provision of a damping or levelling control means for the north-south directed gyroscopic part of the sensitive element of the instrument that is corrected by measurements of the craft's acceleration, course, speed and drift effective through a means that exerts a corresponding torque about the vertical axis of the element.

In accordance with the invention, the slave gyro part of the sensitive element of the instrument includes a levelling control that is corrected by measurements of the cratf's acceleration, velocity, course, latitude and the effect thereon of the horizontal component of the earth's rotation.

The invention also makes provision in the control system of the instrument for compensating for mass unbalance of the frames of the respective gyros.

Other objects, features and structural details of the invention will be apparent from the following description, when read in relation to the accompanying drawings, wherein:

Fig. 1 is a perspective view illustrative of a practical gyroscopic assembly with connecting circuity between the related electrical parts useful in connection with the improved control system.

Figure 2A:
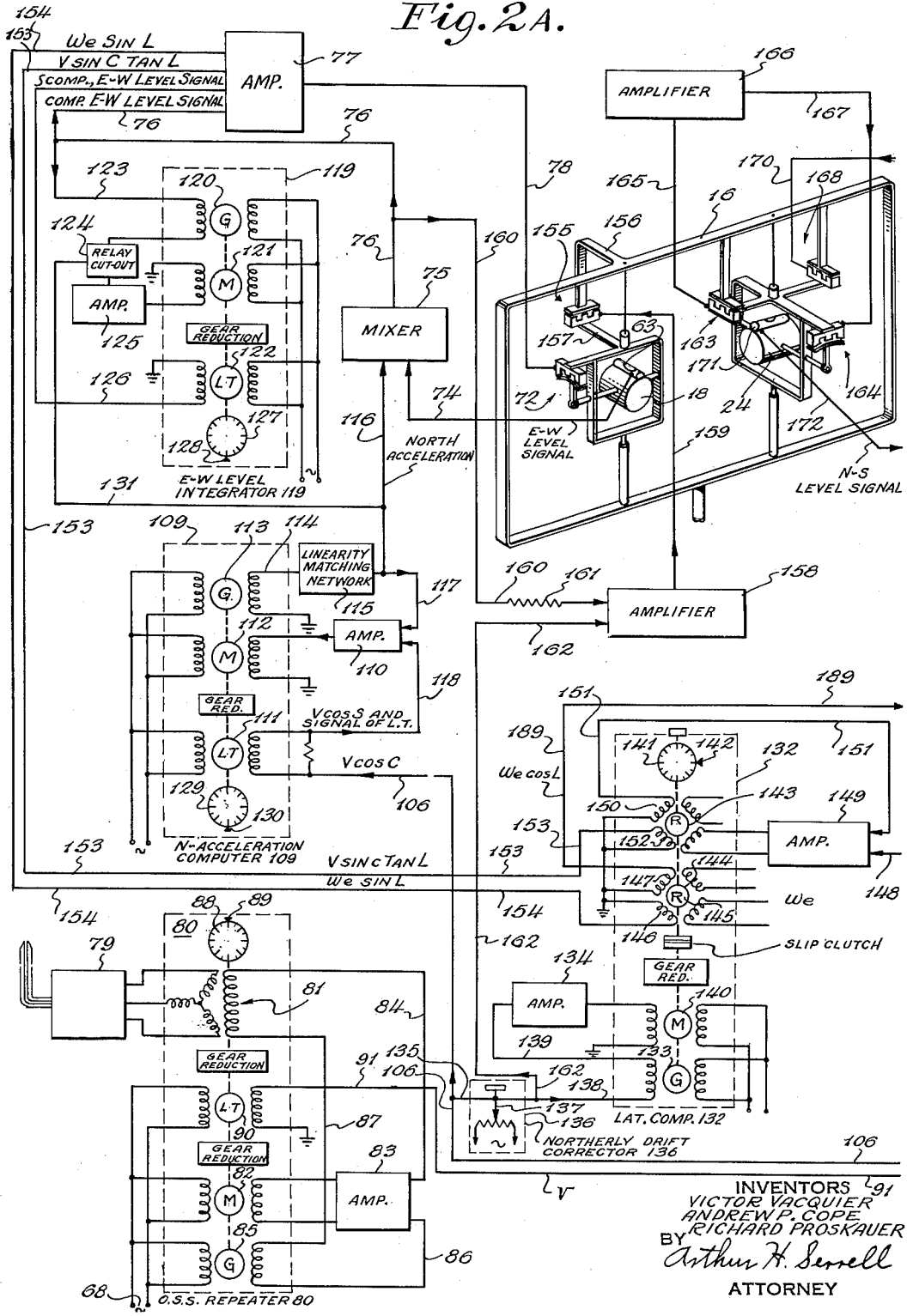

Figs. 2A and 2B taken together form a diagrammatic view showing an embodiment of the control system of the present invention provided for the illustrated gyroscopic instrument with the interconnecting circuity for the electrical elements thereof, and Fig. 3 is an enlarged detail side elevation showing one of the gravity responsive electrolytic levels as employed in the control system, and including the input and output circuity therefor.

The assembly of the gyroscopic parts of the illustrated reference instrument is shown somewhat diagrammatically in Fig. 1 of the drawing. Such instrument may also include a suitable binnacle or housing that is understood to be fixedly mounted on the dirigible craft on which the device is used. As herein shown, the binnacle or housing fixed relative to the craft may include the spaced posts 10 and 11 which mount the device on the craft. The gyroscopic assembly includes a gimbal ring 12 mounted with freedom on the posts by suitable trunnion-bearing connections about an axis 13 which is arranged coincident with the fore and aft or roll axis of the dirigible craft on which the instrument is employed. Ring 12 supports a platform element 14 by suitable trunnion-bearing connections with freedom about a horizontal axis 15 that is coincident with the athwartship or pitch axis of the craft. Platform 14 is universally mounted relative to the housing of the instrument including posts 10 and 11 with freedom about mutually perpendicular axes 13 and 15.

The assembly also includes an azimuth or phantom member herein shown in the form of a ring 16 that is mounted on the platform element 14 with freedom about an azimuth or vertical axis indicated at 17. The connections between the platform 14 and member 16 are provided by suitable trunnions and bearings, as shown. Member 16 is supported with three degrees of freedom relative to the craft or binnacle of the instrument provided by mutually perpendicular axes 13, 15 and 17.

As shown in Fig. 1, the sensitive element of the instrument may consist of two directional type gyros independently supported on the member 16. One of the gyros is provided with a gravity reference as hereinafter described to make the same seek the meridian. This gyro is consequently herein termed the meridian gyro. The other of the gyros is slaved to the meridian-seeking gyro so that its normally horizontal spin axis is directed east-west. The frame of the meridian gyro is designated in Fig. 1 at 18. Frame 18 supports a gyroscopic rotor therein adapted to spin about a normally horizontal north-south directed axis 19 which in the position shown in Fig. 1, is parallel to the pitch axis 15 of the craft. With this position of the parts, it will be understood that the craft on which the instrument is mounted is proceeding on an east-west course. Suitable means such as a motor (not shown) is provided to drive the rotor of the frame 18 at a constant speed. As shown, rotor frame 18 is mounted on ring 16 in neutral equilibrium with freedom about a vertical axis 20 and a second horizontal axis 21 normal to its spin axis. The mounting provided in Fig. 1 is a vertical ring 22 suspended from member 16 by a wire 23. A suitable bearing connects the lower portion of ring 22 to member 16. Suitable trunnion-bearing connections are provided between the frame 18 and the ring 22, the same being, in this instance, in the horizontal plane defined by the mutually perpendicular axes 13 and 15. Frame 18 is consequently supported on the member 16 in neutral equilibrium with freedom about vertical axis 20 and horizontal axis 21 both of which are normal to the rotor spin axis 19. The rotor axis 19 as shown in Fig. 1, is located in the horizontal plane defined by the mutually perpendicular axes 13 and 15.

The frame of the slave gyro of the instrument is indicated at 24. The slaving connection between the gyros will be hereinafter described in detail. Frame 24 supports a gyroscopic rotor adapted to spin about a horizontal east-west axis 25, shown as situated in the horizontal plane defined by axes 13 and 15. Frame 24 is mounted with freedom by a suitable trunnion-bearing connection on a vertical ring 26, the axis of the connection being indicated at 27. As shown, axis 27 is situated in the horizontal plane defined by the axes 13 and 15 of the instrument, the same being directed north-south parallel to the spin axis of the rotor of frame 18. The rotor of the frame 24 is driven at a constant speed by suitable means not herein shown. Ring 26 is mounted on member 16, in a manner similar to ring 22, with freedom about a vertical axis 28. This mounting, as shown, may include a wire 29 connected to ring 26. Frame 24, like frame 18, is mounted in neutral equilibrium on the member 16. Member 16 supports a spaced pair of gyroscopic rotors with normally horizontal spin axes 19, 25 having frames 18, 24 mounted with freedom about vertical axes 20, 28 and normally horizontal axes 21, 27 perpendicular to the respective spin axes. Member 16 is movable about its axis 17 in a manner equivalent to that of the phantom ring in a conventional gyro compass structure. While, as shown, the spin axis 19 and 25 of the respective rotors of the instrument are normally situated in the plane defined by axes 13 and 15, such an arrangement is optional in the device.

The three axis gyroscopic reference instrument provides data relative to the pitch attitude, roll attitude and azimuth position of the craft. This data may be used in any conventional manner now known to the art such as for operating visual indicating repeaters for automatically piloting the craft or for stabilization of instruments employed on the craft.

The instrument includes means operable to stabilize the platform 14 about its axes 13 and 15 from the reference levels determined by the rotor frames 18 and 24 about the respective mutually perpendicular and horizontal axes 21 and 27 thereof. The horizontal plane provided by the noted axes of the frames 18 and 24 define the zenith reference plane of the instrument. Any tilt of the member 16 or table 14 relative to this defined plane is detected by a suitable pick-off associated with each of the frames 18 and 24. The pick-offs used for illustrative purposes in the drawings are an electromagnetic type of the character particularly described in Patent No. 2,419,979, issued May 6, 1947, to J. C. Wilson, that employs relatively movable armature and E-type wound stator parts.

As shown, the pick-off for frame 18 is indicated at 30. The armature of pick-off 30 may be connected to the frame 18 by way of an arm 31 fixed to an extending portion 32 of the trunnion connected to the frame 18. The stator part of the pick-off 30 may be fixedly connected to an extension of the ring 22. The pick-off 33 for frame 24 is shown mounted in a similar manner to that of pick-off 30. In this instance, the armature is connected to frame 24 by way of arm 34 that is fixed to an extending portion 35 of the trunnion connected to frame 24. For the particular heading of the craft, in which the parts of the instrument are illustrated, pick-off 30 measures tilt of the platform 14 about axis 13 and pick-off 33 measures tilt of the platform 14 about axis 15.

The pick-offs 30 and 33 function to provide stabilizing signals for the platform 14 to maintain the axes 13 and 15 thereof in the horizontal reference plane defined by the instrument. The stabilizing means for the platform 14 may include a suitable electric motor 36 situated on post 11 and drivably connected to the platform by way of shaft 37, gearing 38, and one of the trunnions for the gimbal ring 12 on which the platform is supported. Further included in the stabilizing means is a second suitable electric motor 39 mounted on the ring 12 and drivably connected to the platform by way of shaft 40 and gearing 41 to one of the trunnions supporting the platform on the ring 12. Motors 36 and 39 are energized from the signals of pick-offs 30 and 33 by way of a component resolver which may be of the type described in Patent No. 2,533,217 issued December 12, 1950. The resolver indicated at 42 in Fig. 1, includes a wound stator part that is suitably fixed to the platform 14. The wound rotor part of the resolver 42 is fixed to an extending portion 43 of the upper trunnion of member 16. Motors 36 and 39 are connected to the stator part of the resolver 42 by way of respective leads 44, 45, conventional signal amplifiers designated as pitch amplifier 46 and roll amplifier 47, and respective leads 48 and 49. The input to the rotor part of resolver 42 is fed from pick-offs 30 and 33 by way of the respective leads 50 and 51.

The axis of member 16 of the instrument remains vertical and the member is stabilized in azimuth so that the rotor part of the resolver 42 is fixed in space. The azimuthal position of the stator part of the resolver depends on the heading of the craft on which the instrument is employed. With course changes of the craft, the platform 14 moves in azimuth with the craft as it is connected thereto by way of ring 12 and posts 10 and 11. The relative position of the stator and rotor parts of the resolver 42 is consequently dependent on the heading of the craft, the resolver functioning to properly apportion the signals of the pick-offs 30 and 33 to the roll motor 36 and the pitch motor 39 to stabilize the platform about its respective axes 13 and 15 for all headings of the craft. Roll attitude of the craft from a reference position is measured by the instrument by the output of a suitable electrical signal transmitter 52 that may be mounted on the post 11. The rotor of transmitter 52 is positioned by the platform 14 through ring 12, gears 38 and a gear 53 in mesh with one of the gears 38. Pitch attitude of the craft from a reference position is measured by the instrument by the output of a suitable electrical signal transmitter 54 that is mounted on ring 12. The rotor of transmitter 54 is positioned by the platform 14 through gears 41 and a gear 55 in mesh with one of the gears 41.

The designations "Roll data" and "Pitch data" are included in Fig. 1 in connection with the output leads shown for the respective signal transmitters 52 and 54.

Member 16 is stabilized or positioned about its axis 17 to remain fixed in space and thereby provide the reference from which the heading of the craft is determined. Member 16 also maintains the fixed orientation of the rotor of the resolver 42 of the instrument. Stabilization of member 16 is effected as a follow-up from the directed azimuth position provided by one of the rotor frames of the instrument. As shown in Fig. 1, frame 18 is employed for this purpose, the rotor of this frame being directed north-south in a horizontal plane. The means operable to stabilize the member 16 about axis 17 from frame 18 includes a pick-off 56 of the type hereinbefore identified whose armature is shown fixed to the member 16 and whose wound stator is mounted on the ring 22. Pick-off 56 measures displacement of the parts about axis 20, the signal thereof being fed by way of lead 57, a suitable azimuth amplifier 58 and lead 59 to a suitable electric motor 60 mounted on platform or table 14. Motor 60 is operatively connected to the upper trunnion of the member 16 by way of gearing indicated at 61.

The azimuth data provided by the instrument may be obtained from a suitable electrical transmitter 62 fixed to platform 14. Transmitter 62 may be similar to the pitch and roll transmitters 54 and 52, the rotor of the transmitter being connected to one of the gears 61. The designation "Azimuth data" is included in Fig. 1 in connection with the output lead for the transmitter 62. The output of transmitter 62 may be utilized in any manner now known to the art such as in the operation of electrical repeaters. These data are utilized to also operate a particular repeater element in the control system for the instrument known as the own ship's course repeater which will hereinafter be described.

*Azimuth controls for meridian gyro frame 18*

Frame 18 of the meridian gyro of the instrument provides a gyroscopic sensitive element that is mounted in neutral equilibrium whose rotor is driven at a constant speed. The primary azimuth control for this element or gyro to maintain its spin axis directed on the meridian is a gravitationally responsive means that provides the element with a constant pendulous factor. In particular, such means is provided by a liquid level 63 that may be mounted on frame 18, as shown, to detect tilt thereof about the east-west axis 21. It will be understood that the directivity or north seeking quality of the meridian gyro is derived from the pendulous factor of the instrument. The level 63 detects tilt of the frame 18 about the east-west axis 21 due to the effect on the frame of the horizontal component of the earth's rotation.

Fig. 3 shows an enlarged view of one of the liquid level gravity responsive devices used in the instrument. As shown, the level device is formed of a closed housing 64 of electrical insulating material containing therein a suitable conducting electrolyte of predetermined viscosity which fills the housing except for an air bubble. Two horizontal electrodes 65 and 66 connected to the housing 64 extend through the electrolyte and into the bubble so that equal areas of the same are conductive when the level is horizontal and the bubble is centered. A third electrode of the device is indicated at 67. The input to level device 63 as shown in Fig. 3 may be provided by any suitable supply of alternating current electrical energy, as indicated at 68, that is fed to the primary of a transformer 69 whose secondary is connected to electrodes 65, 66. The output circuit of the device 63 is provided by lead 70 connected to electrode 67, and lead 71 having a center tap connection with the secondary of the transformer 69.

The electrodes 65 and 66 are so constructed and arranged in the electrolytic fluid in the housing 64 that the level device provides a limited substantially linear signal output with tilt of the frame 18 about axis 21 within a range of plus or minus one-half a degree from a level condition. Thus, the electrolytic level 63 on the frame 18 detects any out-of-level condition of the frame and provides a signal voltage within the determined limits that is proportional to the degree of the departure of the frame from a level condition about axis 21. The signal from the level 63 is employed to precess the frame 18 about its axis 20 by application of a torque about the axis 21 through means of a suitable torque motor indicated at 72. Motor 72, as herein shown, may be an A. C. induction type motor of the character described in Letters Patent No. 2,270,876, issued January 27, 1942, to O. Esval et al. As shown in Fig. 1, the electromagnetic three pole wound stator of motor 72 is fixedly mounted on ring 22. The cooperating inductive rotor member of the motor is mounted on an arm 73 connected to the extending portion 32 of one of the trunnions of the frame 18. Arms 73 and 31 may be provided by an integral piece that extends radially of axis 21, as shown. With reference to Fig. 2A, the controlling signal output of the gravitationally responsive means or electrolytic level device 63 is fed to operate the torque motor by way of lead 74, a suitable signal combining network herein indicated generally at 75 as a mixer, lead 76 to a suitable mixing amplifier 77 adapted to receive a plurality of other control signals as hereinafter described, and from the amplifier to the stator of the motor 72 by way of lead 78. Thus, the spin axis of the rotor of frame 18 is directly maintained on the meridian due to the effect on the gyro of the horizontal component of the earth's rotation as detected by the electrolytic level 63 on the frame 18. The period of the improved instrument is permitted to change with change in latitude of the craft.

The liquid employed in both level devices 63 and 171 is preferably of sufficient viscosity to suppress or damp out surging during rolling and pitching of the craft so that little or no movement of the liquid in the level devices takes place in phase with the rolling and pitching motions. By limiting the signal of the level devices to that due to substantially one-half a degree tilt and by the damping action described, intercardinal errors are substantially eliminated and ballistic deflection is reduced.

However, additional means are employed to reduce ballistic deflection due to the northerly acceleration of the craft. As the compass assembly is subject to accelerations of the craft in a horizontal plane, the bubble of the electrolytic level signal device 63 is displaced so that the output of the level does not provide a true measure of the level position of the frame 18 about its axis 21. The reason for limiting the output of the level device 63 is to prevent the occurrence in the control system of too great a signal therefrom due to the effect of acceleration. In order to obtain a control signal that is determined only by the tilt of the frame 18 from a level condition about axis 21, the component of the signal due to displacement of the bubble of the level by horizontal acceleration is subtracted from the output of the device 63. As the device 63 is oriented north-south to detect tilt about east-west axis 21, the same is subject to northerly acceleration of the craft.

Means are provided for measuring the craft's northerly acceleration, such measurement being an electrical signal that is combined in the mixer 75 in opposition to the signal from the tilt detecting liquid device 63. The measuring means includes a suitable device for providing a signal proportional to the speed of the craft. In the present instance, such means is provided by a pitometer log as indicated at 79 and an own ship's speed repeater indicated at 80. It will be understood that with the speed measuring device illustrated the pitometer of the log 79 is situated exteriorly of the craft in a position in which the respective dynamic and static tubes thereof provide a differential pressure measurement corresponding to the speed of the craft. Such measurement is utilized in the log 79 to actuate the rotor of a suitable signal transmitter (not shown) that may be similar to the data transmitters of the instrument. The output of such transmitter operates an electrical repeater indicated at 81 which is driven to a null position by means of a motor, generator and signal transmitter combination that may be of the character described in Letters Patent No. 2,450,907, issued October 12, 1948, to J. C. Newton et al.

As shown in Fig. 2A, the output of the rotor of the repeater 81 is employed to drive a motor 82 by way of amplifier 83. Lead 84 connects the rotor of the repeater 81 and amplifier 83. Generator 85 driven by motor 82 provides an output signal to amplifier 83 by way of lead 86 that is opposed to the control signal from repeater 81. Lead 87 connects the winding of the rotor of the repeater 81 and the output winding of generator 85, as shown. Motor 82 is operatively connected to the rotor of the repeater by an indicated mechanical connection consisting of suitable shafting and gear reduction connections, as shown. It will be understood, that motor 82 positions the rotor of the repeater 81 so that there is a null output therefrom, the shaft of the rotor of the repeater 81 then reflecting the speed data of the pitometer log 79. An indicator 88 fixed to the shaft of the rotor of the repeater 81 read relative to a fixed index 89, provides an observable measurement of the speed of the craft. The motor 82 is also employed to position the rotor of a suitable electrical linear signal transmitter 90 whose output winding provides a signal proportional to the speed of the craft. This signal is transmitted by way of output lead 91. The designation V as applied in the drawings represents a lead carrying a signal proportional to the speed of the ship or craft as measured by the pitometer log 79. The exciting windings of the generator 85, motor 82 and linear signal transmitter or synchro 90 may be energized from a common A. C. source 68 of electrical energy as shown in Fig. 2A.

As shown in Fig. 2B, the signal V is fed through an isolation amplifier 92 to the exciting winding of a sine-cosine synchro resolver indicated at 93 in the own ship's course repeater 94. The data for operating repeater 94 is obtained from transmitter 62, Fig. 1, that provides the azimuth data of the master compass. The receiver for transmitter 62 is indicated at 95, the rotor of the receiver controlling a closed loop servo system of the motor-generator type of the character used in the heretofore described repeater 80. In this instance, the motor indicated at 96 is driven by the output of amplifier 97 fed by lead 98 from the rotor of the receiver 95. The output of the motor driven generator 99 is fed to amplifier 97 by way of lead 100, this signal opposing the signal from the rotor of the receiver 95 to provide close speed regulation of the motor. Lead 101 interconnects the winding of the rotor of receiver 95 and the output winding of the generator 99, as shown. Motor 96 is connected through an indicated gear reduction to the rotor of the receiver 95, which is driven to a null position or condition in which the same is in agreement with the azimuthal position of the rotor of transmitter 62. The own ship's course repeater 94 also functions through its receiver 95 to position the rotor of the sine-cosine resolver 93 by way of suitable interconnecting shafting. As shown, the rotor of receiver 95 is shaft-connected to a compass dial 102 that rotates relative to fixed index 103 to provide an indication of the course of the craft. The input winding to resolver 93 is indicated at 104, this winding as shown in Figs. 2A and 2B receiving the signal V from transmitter 90 of repeater 80 by way of amplifier 92. Cosine winding 105 of resolver 93 provides an output that is proportional to the craft's speed times the cosine of the craft's heading. This output is transmitted by way of lead 106 which is also designated as V cos C, with C being the craft's heading or course. The voltage signal of lead 106 provides a measure of the northerly speed of the craft. Sine winding 107 of resolver 93 provides an output that is proportional to the craft's speed times the sine of the craft's heading. This output is transmitted by way of lead 108, the same providing a measure of the easterly speed of the craft.

In accordance with the present invention, the northerly speed measuring signal of winding 105 is applied to an acceleration computer designated at 109 in Figs. 2A. This computer includes a closed servo loop or motor-generator-signal transmitter combination of the character employed in repeaters 80 and 94. In the present instance, the input signal V cos C is fed the computer 109 by way of lead 106, the same being applied as an input to amplifier 110 in series with the output of a linear signal transmitter 111. The output of amplifier 110 supplies power to motor 112 that is connected to the rotor of transmitter 111 through suitable shafting and a gear reduction means as shown. Amplifier 110 is so phased that with acceleration or deceleration of the craft in a northerly direction, motor 112 is operative to rotate the rotor of the linear signal transmitter 111 until its output signal equals that of the northerly speed component signal. A speed generator 113 driven by the motor 112 produces a signal proportional to the speed or time derivative of the displacement of the shaft of motor 112. The output of generator 113 is then proportional to the rate of change of speed or northerly acceleration of the craft. This output is carried by lead 114. Since the limited control signal of the gravity responsive electrolytic level 63 is only substantially linear throughout its range, the output of generator 113 is made to match the linearity of the level by a suitable electrical network designated at 115 as a linearity matching network. The acceleration signal is fed from network 115 by way of lead 116 to mixer 75 in which the northerly acceleration signal is subtracted from the control signal from level 63. The signal of the gravitationally responsive level 63 is thereby compensated for the effect of northerly acceleration thereon and the output from the mixer 75 provides a close measure of the tilt angle of the frame 18 within the designed limits of the level. The input to amplifier 77 for operating torque motor 72 from the gravity source is fed to amplifier 77 by way of lead 76 from mixer 75. The lead 76 to amplifier 77 is noted as supplying the compensated east-west level signal which provides the primary azimuth control for the instrument by which the spin axis of the rotor of the frame 18 is directed north-south. As shown in Fig. 2A, the signal of generator 113 of computer 109 is also applied in series with the input to amplifier 110 from transmitter 111 and resolver 93. This input is fed to amplifier 110 by way of lead 117 to insure that the speed of motor 113 is determined by the difference between the V cos C signal and the signal of transmitter 111. Lead 118 connects amplifier 110 to transmitter 111 and lead 106. Motor 72 of the instrument provides a means for exerting a torque for precessing the frame 18 about its axis 20. Motor 72 is also effective to precess the frame 18 in accordance with the difference between the measurements of the gravity responsive tilt measuring device 63 and the northerly acceleration measuring means of the instrument.

Any constant torque such as one due to mass unbalance of the frame 18 causes the meridian gyro to precess and settle with an error in tilt about axis 21. In order to remove or compensate the instrument for such error, a correction signal is produced that is employed to operate the torque motor 72 and thereby apply a torque to the gyro that is equal and opposite to the constant error torque. This signal is obtained from a computer designated as the east-west level integrator 119 in Fig. 2A of the drawing. This computer forms a signal means providing a time integral measurement of the output of the mixer 75. Integrator 119 is responsive to the northerly acceleration compensated signal of the gravitationally responsive liquid level device 63. If the compensated level signal does not average to zero over a period of time or in other words if the time integral of the compensated level signal is not zero, the integrator 119 is effective to provide a correction signal to operate torque motor 72 to obtain this condition. This correction signal is obtained from the integrator 119 which includes a motor-generator and linear signal transmitter of the character hereinbefore described. In the present arrangement, the speed generator designated at 120 is directly coupled to motor 121 which drives the linear signal transmitter 122 through suitable reduction gearing. The output signal of generator 120 is a linear function of its shaft speed. Integration of the compensated east-west level signal is accomplished by controlling the motor 121 so that its speed is proportional to the compensated level signal. The level signal is applied in series with the output of speed generator 120 by way of lead 123, connected to lead 76, through relay 124 to an amplifier 125 whose output operates the motor 121. Amplifier 125 receives the difference between the compensated level signal and the output signal of generator 120, the same regulating the speed of the motor 121 so as to minimize this difference. In this manner the speed of motor 121 and its driven generator 120 is made proportional to the compensated level signal. The total shaft rotation of the motor driven linear signal transmitter 122 over a period of time is therefore a measure of the average value of the time integral of the compensated level signal for that period of time. The output of the transmitter or synchro 122 is fed to torque motor 72 by way of lead 126 to amplifier 77 and then by lead 78 to the torque motor 72. The input to amplifier 77 from this source is designated in Fig. 2A of the drawing as the integral of the compensated east-west level signal. Dial 127 driven by the rotor of transmitter 122 is readable on index 128 to indicate the output of the integrator 119. Dial 129, in the northerly acceleration computer 109, driven by the rotor of transmitter 111, is readable on index 130 to indicate the northerly component of the speed of the craft.

The integrator 119 of the instrument may accumulate an error due to large persistent northerly accelerations. Provision is therefore made to disconnect the input to the integrator 119 during periods when the horizontal northerly acceleration is of sufficient magnitude to obtain a maximum output of the electrolytic level 63. The normally closed armature of relay 124 provides a normally ineffective means for disabling the integrator 119. Lead 131 connects relay 124 to lead 116 which feeds the northerly acceleration signal to the mixer 75. Relay 124 is designed to operate and open the circuit to amplifier 125 when the output of the computer 109 exceeds a predetermined limit. The relay 124 therefore operates to render the normally ineffective means effective to disable the integrator 119 during the occurrence of the noted condition.

In accordance with the present invention, the meridian gyro is also directly corrected for the effect thereon of movement of the craft relative to the earth. This error in the instrument is corrected by deriving a signal in accordance with the speed, course and latitude of the craft by means herein described. Such a corrective or compensating signal is applied to motor 72 to torque the frame 18 about axis 21 and thusly precess the frame about its vertical axis 20 as required to maintain it in an azimuthal position in which the spin axis of the rotor of the frame 18 is directed north-south. A gyro is adapted to detect rotation about any axis normal to its spin axis. When the meridian gyro of the improved instrument is carried on a craft moving in an easterly direction at a latitude other than zero, the gyro is subject to an error about vertical axis 20 due to the movement of the craft relative to the surface of the earth. Due to this movement the meridian gyro, unless corrected, would turn away from its directed azimuth position about axis 20 at a rate proportional to the easterly speed of the craft and the tangent function of the craft's latitude. In order to correct for this source of instrument error a corrective torque at motor 72 is produced that is proportional to the easterly speed of the craft multiplied by the tangent of the latitude of the craft. The signal means providing a measurement of this character includes a latitude computer indicated at 132 in Fig. 2A.

As herein shown, this control signal is firstly obtained by the production of a shaft rotation proportional to the latitude of the craft. In attaining this result, a signal proportional to the northerly component of the speed of the craft as represented by the output of cosine winding 105 of resolver 93 along with a signal proportional to the northerly drift of the craft is applied in series with the output of a speed generator 133 in computer 132 to the input of an amplifier 134. The speed signal is obtained from lead 106 by a connecting lead 135. The northerly drift corrector 136 is represented in the drawing as a potentiometer with separate A. C. excitation having a manually adjustable slider 137. The knob operating the slider 137 is set relative to an indicated null point in accordance with the estimated or calculated drift of the craft relative to the earth. Lead 138 carries the combined speed and drift signal to the output winding of generator 133. Lead 139 connects the output winding of the generator 133 to amplifier 134. The signal from amplifier 134 supplies power to the control field of motor 140 located in the latitude computer. The illustrated motor-generator combination provides a servo loop similar to that hereinbefore described in the level integrator 119. In the tangent computer, the signal of the speed generator 133 is compared with the sum or difference of the northerly speed and northerly drift signals. Amplifier 134 is so phased as to make the motor 140 and hence the generator 133 shaft speed such that the signal of the generator 133 is made very nearly equal to the resultant of the other signals. As illustrated, the generator 133 is directly driven by the motor 140 by a shaft connection. With this arrangement, the total shaft rotation of the motor 140 is determined by the magnitude and duration of the northerly speed and northerly drift signals. As shown in Fig. 2A, the computer includes a latitude dial 141 that is read in connection with a fixed index 142. Dial 141 is settable by a manually operable knob and is connected to motor 140 through suitable shafting including a slip clutch that permits resetting of the dial and reduction gearing, as shown. When the latitude computer shaft adjustment is set at a known latitude by the knob, subsequent latitude positions of the craft from this initial latitude are automatically effected as the craft changes latitude by reason of the operations of motor 140. Dial 141 relative to index 142, therefore, provides a correct indication of the latitude of the craft at all times.

The shaft of the motor 140 of the latitude computer 132 is geared to the shafts of two sine-cosine synchro resolvers indicated respectively at 143 and 144 through the indicated reduction gearing and clutch in such a manner that a one degree rotation of the resolver shafts corresponds to a one degree change in latitude. The exciting winding of resolver 144 is indicated at 145. Winding 146 provides a signal proportional to the sine of the latitude and winding 147 provides a signal proportional to the cosine of the latitude. The signals of the resolver 144 are utilized in the control system in a manner hereinafter described. Resolver 143 forms a part of the tangent computing servo loop. In this computer, a signal proportional to the easterly speed of the craft ($V \sin C$) obtained from the winding 107 of resolver 93 by way of lead 108 and connecting lead 148 is applied to the input of an amplifier 149 whose output provides the excitation for resolver 143. The signal of cosine winding 150 of resolver 143 is then proportional to the product of the cosine of the latitude and the output of amplifier 149. This signal is then applied by way of lead 151 as a feedback voltage to the input to the amplifier 149 in series with the easterly speed signal obtained from lead 148. By the use of this feedback signal the output voltage from winding 150 is modified in such a form that it is proportional to the product of the gain of the amplifier 149 and the difference between the easterly speed voltage ($V \sin C$) and the feedback signal which is proportional to the cosine of the latitude of the craft. Thus, the feedback ratio of the amplifier 149 is equal to the cosine of the shaft displacement of the resolver 143 or the cosine of the latitude of the craft. With $e_0$, as the output of the amplifier 149, (A) the gain of the amplifier, (B) the feedback ratio, and $e_1$ the input to the amplifier 149 by way of lead 148; the amplifier equation may be written as follows:

(1) $$e_0 = A(e_1 - Be_0)$$

(2) $$e_0 = \frac{e_1}{B} \cdot \frac{1}{\left(\frac{1}{AB}+1\right)}$$

since $$B = \cos L$$

(3) $$e_0 = \frac{e_1}{\cos L} \cdot \frac{1}{\left(\frac{1}{A \cos L}+1\right)}$$

The output signal of the sine winding 152 of the resolver 143 is proportional to the product of the sine of the latitude and the output of amplifier 149, as represented by (4) $$E = e_0 \sin L$$

The gain A of amplifier 149 is made large so that the term with the parenthesis in Equation 3 may be neglected. Substituting $e_1/\cos L$ for $e_0$ in Equation 4 and evaluating $e_1$ as ($V \sin C$) the equation becomes (5) $$E = V \sin C \tan L$$

This signal is fed from the output winding 152 of resolver 143 by way of lead 153 to amplifier 77, thence by way of lead 78 to motive means or motor 72 that is effective to exert a corresponding corrective torque about the horizontal axis 21 of the frame 18. This control signal for motor 72 is proportional to the speed, course and latitude ($V \sin C \tan L$) of the craft. Such signal may be obtained from the herein described means or other suitable deriving means.

As hereinbefore described, the ballistic or gravitational control of the meridian gyro of the instrument is provided by the electrolytic level 63 as influenced by the horizontal component of the earth's rotation. However, the vertical component of the earth's rotation causes the meridian gyro to appear to precess about axis 20 and if not compensated would cause the frame 18 to settle with its spin axis 19 tilted from a level condition about axis 21. The instrument constructed in accordance with the present invention is also compensated for this error through the exertion of a torque about axis 21 by the motor 72. The horizontal and vertical components of the earth's rotation vary in proportion to the cosine and sine of the latitude, respectively. The system includes means for deriving a signal proportional to the vertical component of the earth's rotation at the latitude of the craft. Such means, as herein provided, includes the resolver 144 of latitude computer 132. As shown, the exciting winding 145 of resolver 144 is energized from a suitable electrical source with a signal proportional to the earth's rotation as represented by ($We$), Fig. 2A. The output of the sine winding 146 of resolver 144 provides a signal ($We \sin L$) which provides the desired correction. This signal is fed from winding 146 to amplifier 77 by way of lead 154. From amplifier 77 the corrective signal operates motor 72 by way of lead 78.

Effectively, each of the hereinbefore described signal inputs to amplifier 77 are reflected in the operation of torque motor 72. Each of the control signals may be considered to be directly effective at the motor 72, or the same may be considered as combined in the amplifier 77 to provide a single operating signal for the motor 72.

*Damping or levelling controls for meridian gyro frame 18*

The damping or levelling controls for the gyro instrument are exerted on the rotor frame element 18 through the medium of a torque exerting means effective about azimuth axis 20 herein shown as a torque motor 155 which is illustrative of the same character as heretofore described torque motor 72. As shown in Figs. 1 and 2A, the wound stator of motor 155 is suitably fixed to an extension 157 of the ring 22. The armature of the motor is mounted on an extension 156 from the vertical member 16. The input to motor 155 is obtained from an amplifier 158, Fig. 2A, by way of lead 159.

In accordance with the present invention, the primary control input for the amplifier 158 is obtained from lead 160 which connects with lead 76 which carries the compensated east-west level signal from mixer 75. This signal is formed of the combined outputs of the gravitationally responsive device or electrolytic level 63 and the northerly acceleration computer 109. The portion of this control signal tapped from lead 76 by lead 160 is regulated by resistor 161 in lead 160, the same determining the ratio of the gravity or ballistic control torque and damping control torque for the instrument. The selected ratio may be such as to provide the variable period instrument with a three hour period at the latitude of New York City, New York. In the instrument, the period is permitted to change with change in latitude of the craft. Frame 18 is mounted in neutral equilibrium and its rotor is driven at a constant speed. The pendulous factor or gravity torque control as determined by the electrolytic level device 63 is also constant in the improved instrument.

Heretofore, northerly acceleration errors were compensated for in gyro compass instrument by attempting to maintain the period of the compass constant at a value such as 84 minutes at all latitudes. This is approximated in some commercial compasses by increasing the pendulous or gravity factor as the craft proceeded to higher latitudes or by adjusting the speed of the rotor of the instrument with the secant of the latitude. The pendulous correction disturbs the compass and the speed adjustment reduces the sensitivity of the instrument. No satisfactory method of achieving constancy of the period of a gyro compass type of instrument with change in latitude of the craft appears to exist to date.

In accordance with the present invention, the meridian gyro frame 18 is compensated for the effect thereon of the craft's speed in a northerly directional as well as the craft's northerly drift. Such correction is obtained from levelling torque motor 155 in response to a correction signal from amplifier 158 by an input thereto from lead 162 connected to lead 138, Fig. 2A. The signal at lead 138 is provided by northerly drift corrector 136 and lead 106 supplied from output winding 105 of resolver 93 of the repeater 94. Lead 106 carries a signal ($V \cos C$) that is proportional to the northerly speed of the craft. Frame element 18 is therefore further damped in accordance with a signal proportional to the speed, cosine of the course and northerly drift of the craft.

*Azimuth control for slave gyro frame 24*

Gyro frame 24 is slaved to gyro frame 18 so that the spin axis 25 of its rotor is directed east-west. The arrangement herein shown to perform this function, includes the heretofore described follow-up connection between frame 18 and the stabilized azimuth member 16. This connection includes the gearing 61 for driving the member 16, motor 60 drivably connected to the gearing 61, lead 59, azimuth amplifier 58, lead 57 and pick-off 56 at the meridian gyro. As shown, the rotor of the second or slave gyro spins about a normally horizontal axis 25 in its frame 24. The frame 24 is supported on the stabilized azimuth member 16 with freedom about a vertical or azimuth axis 28. The slaving arrangement herein shown further includes a second follow-up connection between the azimuth stabilized member 16 and the frame 24 by which the spin axis of the rotor of frame 24 is positioned in perpendicular relation to the north-south directed spin axis of the meridian gyro frame 18. Such second connection may include a pick-off 163, Figs. 1 and 2A, which is shown to be of the same character as electrical pick-off 56 at the meridian gyro. The armature of pick-off 163 is mounted on ring 16 through a suitable extension. The wound stator part of the pick-off 163 is connected to an extension of the vertical ring 26 that supports the frame 24. As arranged, the pick-off 163 measures any departure of the spin axis of the rotor of frame 24 from a directed east-west position. The output of the pick-off 163 is effective to restore the desired condition through the follow-up connection which further includes torque motor 164. Motor 164 operates to exert a torque about axis 27 of the frame 24 to precess the ring 26 in a direction to zero the operating output signal from pick-off 163. Motor 164 and pick-off 163 are connected as shown by way of lead 165, amplifier 166 and 167. As illustrated, motor 164 is of the same character as torque motors 72 and 155. Inasmuch as the azimuth position of the slave gyro is not critical, no additional torques are applied thereon through motor 164 to correct for the effect thereon of the rotation of the earth, the speed of the craft or any constant torque such as due to unbalance of the frame 24.

*Slave gyro frame levelling controls*

The slave gyro frame 24 provides a reference about the horizontal north-south axis 27 of the three-axis gyro instrument from which tilt data from pick-off 33 is obtained. Thus, in conjunction with the meridian gyro frame 18, the slave gyro frame 24 establishes a horizontal datum plane as defined by axis 27 of the slave gyro and by axis 21 of the meridian gyro. The levelling controls for the slave gyro are effected through a torque motor 168 similar to motors 164, 155 and 72. As shown, the armature of motor 168 is located on a suitable extension of member 16. The wound stator of the motor 168 is fixedly mounted to an extension from the stabilized azimuth member 16. Motor 168, as shown, provides a means for exerting a torque about the vertical axis 28 of the ring 26 to precess the frame 24 about axis 27 to a level condition. The signal operating the motor 168 is obtained from a mixing amplifier 169 by way of lead 170. Amplifier 169 may be similar to the heretofore described amplifier 77 whose output operates motor 72 of the meridian gyro frame 18.

This control for the slave gyro also includes a gravitationally responsive device such as an electrolytic level 171 located on frame 24. Level device 171 may be of the same character as device 63 on frame 18, the level then providing a limited substantially linear output signal with tilt of the frame 24 about north-south horizontal axis 27 within a range of plus or minus one-half a degree from a level condition. Lead 172 connects the gravity responsive electrolytic level 171 to a mixer 173 similar to the noted mixer 75. As for gyro frame 18, the slave gyro is corrected for the effect thereon of east-west horizontal acceleration effective through the gravity level 171. Means are consequently provided for obtaining a measure or signal proportional to the acceleration of the craft in an east-west direction. Such means, as herein shown in Fig. 2B, may include an easterly acceleration computer 174 which may be similar in character to the described northerly acceleration computer 109. In this instance, the signal input to the computer 174 corresponds to the easterly speed of the craft, such signal being obtained from the sine winding 107 of the resolver 93 of the repeater 94 by way of lead 108, lead 148 and lead 175 connected to lead 148, Fig. 2B.

The input lead 175 to computer 174, as in computer 109, is connected in series with the output winding of transmitter 176. The combined $V \sin C$ and transmitter 176 signal is fed to amplifier 177 by way of lead 178. Amplifier 177 provides an output that is fed to the control winding of motor 179 by way of lead 180. Generator 181 of the servo loop provides an output that is fed by way of leads 182 and 183 to mixer 173, the same providing a signal corresponding to the easterly acceleration of the craft. Mixer 173 combines the gravity and acceleration signal subtractively and the output thereof representing a compensated north-south level signal is fed to amplifier 169 by way of lead 184. A repeat back signal from the output winding of generator 181 is also supplied the amplifier 177 by way of lead 185. As in computer 109, the motor 179 of computer 174 drives the rotor of generator 181 and the rotor of transmitter 176. As shown, the motor 179 also positions the dial 186 of an easterly speed indicator. Dial 186 is read relative to a fixed index 187.

The slave gyro is also corrected for the effect thereon of the component of the speed of the craft in an easterly direction. In the control system, this compensating signal is obtained from the sine winding 107 of resolver 93 of repeater 94 which provides signal $V$ sine $C$. The correction is fed to amplifier 169 from lead 108 by way of lead 188.

The slave gyro is also compensated for the effect thereon of the horizontal component of the earth's rotation. This correction is proportional to the cosine of the latitude. Such a signal is obtained from the cosine winding 147 of resolver 144 of the latitude computer 132, Fig. 2A. This signal is applied as an input to mixing amplifier 169 being fed thereto by way of lead 189.

Any constant torque such as due to mass unbalance of the frame 24 causes the slave gyro to precess and settle with an error in tilt about axis 27. In order to compensate the slave gyro of the instrument for such error, a correction signal is provided to operate motor 168 through amplifier 169 to apply a torque on the gyro that is equal and opposite to the unbalance. A north-south level integrator 190 that may be of the same character as described integrator 119 is employed to provide the necessary correction signal. In integrator 190, the compensated north-south level signal provides an input to amplifier 191 by way of lead 192. As shown, lead 192 is series connected with the output winding of generator 193 which is connected to amplifier 191 through lead 194. Motor 195 operated by the output of amplifier 191 is drivably connected to generator 193 and to the rotor of signal transmitter 196. The output winding of the transmitter 196 provides a signal proportional to the time integral of the compensated north-south level signal that is fed to amplifier 169 by way of lead 197. This is designated as the integral of the compensated north-south level signal in Fig. 2B of the drawing. Dial 198 driven by motor 195 provides an indication relative to index 199 for the integrator 190.

Throughout the drawings, the electrical circuit connections have been schematically indicated as extending directly between the electrically interconnected parts of the instrument. In practice, however, slip rings and brushes of conventional construction are provided at the bearing-trunnions connections between mechanically joined parts to facilitate the passage of electrical energy therethrough. Such details are now shown in the drawings in order to avoid unnecessary complication thereof.

Since many changes could be made in the above-construction and many apparently widely different embodiments of the invention could be made without departing from the scope thereof, it is intended that all matter contained in the above description or shown in the accompanying drawings shall be interpreted as illustrative and not in a limiting sense.

What is claimed is:

1. A three axis gyroscopic reference instrument for dirigible craft comprising a platform supported with freedom about pitch and roll axes, a member supported on said platform with freedom about a vertical axis, a first gyroscopic rotor with a normally horizontal spin axis having a frame mounted on said member with freedom about a vertical axis and a horizontal axis, a gravity responsive device providing a limited measure of the tilt of the frame from a level condition about its horizontal axis, means for measuring the acceleration of the craft in a north-south direction, means for precessing said frame about its vertical axis in accordance with the difference between the measurements of said tilt measuring device and said north-south acceleration measuring means; a second gyroscopic rotor with a normally horizontal spin axis having a frame mounted on said member with freedom about a vertical axis and a horizontal axis, means for slaving said second rotor to said first rotor so that the spin axis thereof is perpendicular to the spin axis of the first rotor, a second gravity responsive device providing a limited measure of the tilt of the second rotor frame about its horizontal axis, means for measuring the acceleration of the craft in an east-west direction, and means for exerting a torque about the vertical axis of said second rotor frame in accordance with the difference between the measurements of said second tilt measuring device and said east-west acceleration measuring means.

2. In a gyroscopic instrument for dirigible craft, the combination of a reference comprising a gyroscopic rotor with a normally horizontal, north-south directed, spin axis having a frame supported with freedom about a vertical and a normally horizontal axis perpendicular to the spin axis, means for exerting a torque for precessing the frame about its vertical axis, means providing a limited meridian seeking control signal including a gravity responsive liquid level responsive to tilt of the frame from a level condition about its horizontal axis, means providing a signal in accordance with the acceleration of the craft in a north-south direction, and means for operating said torquing means by the algebraically combined signals of said meridian seeking signal means and said acceleration signal means.

3. In an azimuthal reference instrument for dirigible craft, a gyroscopic rotor with a north-south spin axis having a frame supporting said rotor with freedom about an azimuth axis and a normally horizontal east-west axis, a gravity responsive device providing a limited measure of the tilt of the frame from a level condition about its east-west axis, means for measuring the acceleration of the craft in a north-south direction, and means for precessing said frame about its azimuth axis in accordance with the difference between the measurements of said tilt measuring device and said acceleration measuring means.

4. In an azimuthal reference instrument for dirigible craft, a gyroscopic rotor with a north-south spin axis having a frame supporting said rotor with freedom about an azimuth axis and a normally horizontal east-west axis, a gravity responsive device providing a limited signal in accordance with tilt of the frame from a level condition about its east-west axis, means for providing a signal in accordance with the acceleration of the craft in a north-south direction, means for mixing the signals of said tilt signal device and acceleration signal means algebraically, signal means providing a time integral measurement of the output of said mixing means, and means for precessing said frame about its azimuth axis in accordance with the difference between the output of said mixing means and said time integral measuring signal means.

5. An instrument as claimed in claim 4, including normally ineffective means for disabling said time integral means, and means operable when the signal of said acceleration signal means exceeds a predetermined limit for rendering said normally ineffective means effective.

6. In an azimuthal reference instrument for dirigible craft, a gyroscopic rotor with a horizontal spin axis having a frame supporting said rotor with freedom about an azimuth axis and a normally horizontal axis; meridian seeking control means for said reference including gravitationally responsive signal means providing a limited output in accordance with tilt of the frame from a level condition about its horizontal axis, and means for exerting a torque about the horizontal axis of the frame; means for deriving a signal in accordance with the speed, sine of the course and tangent of the latitude of the craft, and means for operating said torque exerting means from said signal deriving means and gravitationally responsive means.

7. In an azimuthal reference instrument for dirigible craft, a gyroscopic rotor with a horizontal spin axis having a frame supporting said rotor with freedom about an azimuth axis and a normally horizontal axis; meridian seeking control means for said reference including gravitationally responsive signal means providing a limited output in accordance with tilt of the frame from a level condition about its horizontaal axis, and means for exerting a torque about the horizontal axis of the frame; means for deriving a signal in accordance with the speed, northerly drift, sine of the course and tangent of the latitude of the craft, and means for operating said torque exerting means from the signals of said deriving means and said gravitationally responsive means.

8. In an azimuthal reference instrument for dirigible craft, a gyroscopic rotor with a north-south spin axis having a frame supporting said rotor with freedom about an azimuth axis and a normally horizontal east-west axis, a gravitationally responsive device providing a limited signal in accordance with tilt of the frame from a level condition about its east-west axis, means for providing a signal in accordance with the acceleration of the craft in a north-south direction, means for mixing the signals of said tilt signal device and acceleration signal means algebraically, means for deriving a signal in accordance with the speed, course and latitude of the craft, and means for precessing said frame about its azimuth axis in accordance with the signals of said mixing means and signal deriving means.

9. In an azimuthal reference instrument for dirigible craft, a gyroscopic rotor with a north-south spin axis having a frame supporting said rotor with freedom about an azimuth axis and a normally horizontal east-west axis, a gravitationally responsive device providing a limited signal in accordance with tilt of the frame from a level condition about its east-west axis, means for providing a signal in accordance with the acceleration of the craft in a north-south direction, means for mixing the signals of said tilt signal device and acceleration signal means algebraically, signal means providing a time integral measurement of the output of said mixing means, means for deriving a signal in accordance with the speed, course and latitude of the craft, and means for precessing said frame about its azimuth axis in accordance with the signals of said mixing means, time integral measurement means, and deriving means.

10. In an azimuthal reference instrument for dirigible craft, a gyroscopic rotor with a north-south spin axis having a frame supporting said rotor with freedom about an azimuth axis and a normally horizontal east-west axis, a gravitationally responsive device providing a limited signal in accordance with tilt of the frame from a level condition about its east-west axis, means for providing a signal in accordance with the acceleration of the craft in a north-south direction, means for mixing the signals of said tilt signal device and acceleration signal means subtractively, signal means providing a time integral measurement of the output of said mixing means, means for deriving a signal in accordance with the speed, course and latitude of the craft, means for deriving a signal proportional to the vertical component of the earth's rotation at the latitude of the craft, and means for precessing said frame about its azimuth axis in accordance with the signals of said mixing means, time integral measurement means; speed, course and latitude deriving means, and earth's rotation deriving means.

11. In a gyro reference instrument for dirigible craft, a gyroscopic element with a north-south spin axis having freedom about an azimuth axis, means for correcting said element for error due to northerly acceleration of the craft, including motive means operable to precess the element about its azimuth axis, and signal means providing a measure of the craft's northerly acceleration for operating said precessing means.

12. In a gyro reference instrument for dirigible craft, a gyroscopic element with a north-south spin axis having freedom about an azimuth axis, and means for correcting said element for error due to the craft's speed, course, latitude, northerly acceleration and drift, including motive means operable to precess the element about its azimuth axis, first signal means providing a measure of the craft's speed, course, latitude, and northerly drift for operating said precessing means, and second signal means providing a measure of the craft's northerly acceleration for operating said precessing means.

13. In a gyro reference instrument for dirigible craft, a gyroscopic element with a north-south spin axis having freedom about an azimuth axis and a normally horizontal east-west axis, a gravitationally responsive device providing a limited signal in accordance with tilt of the element from a level condition about its east-west axis, means for providing a signal in accordance with the acceleration of the craft in a north-south direction, and means for exerting a torque about the azimuth axis of the element responsive to the signals of said gravitational device and acceleration signal means for damping the element.

14. In a gyro reference instrument for dirigible craft, a gyroscopic element with a north-south spin axis having freedom about an azimuth axis and a normally horizontal east-west axis, a gravitationally responsive device providing a limited signal in accordance with tilt of the element from a level condition about its east-west axis, means for providing a signal in accordance with the acceleration of the craft in a north-south direction, means for deriving a signal proportional to the speed and course of the craft in a north-south direction, and means for exerting a torque about the azimuth axis of the element responsive to the signals of said gravitational device, acceleration signal means and signal deriving means for damping and levelling the element.

15. In a gyro reference instrument for dirigible craft, a gyroscopic element with a north-south spin axis having freedom about an azimuth axis and a normally horizontal east-west axis, a gravitationally responsive device providing a limited signal in accordance with tilt of the element from a level condition about its east-west axis, means for providing a signal in accordance with the acceleration of the craft in a north-south direction, means for deriving a signal proportional to the speed, cosine of the course and northerly drift of the craft, and means for exerting a torque about the azimuth axis of the element responsive to the signal means and signal deriving means for damping the element.

16. In a gyroscopic instrument for dirigible craft, a gyroscopic rotor with a normally horizontal spin axis having a frame supported with freedom about a vertical axis and a normally horizontal axis perpendicular to the spin axis, means for directing the frame so that its spin axis points east-west, means for exerting a levelling torque about the vertical axis of the frame, a gravity responsive signal device providing a limited measure of the tilt of the frame from a level condition about its horizontal axis, means providing a signal in accordance with the acceleration of the craft in an east-west direction, and means for operating said torquing means by the opposingly combined signals of said tilt measuring device and said acceleration signal means.

17. In a gyroscopic instrument for dirigible craft, a gyroscopic rotor with an east-west spin axis having a frame supporting said rotor with freedom about an azimuth axis and a normally horizontal north-south axis, a gravity responsive device providing a limited measure of the tilt of the frame from a level condition about its north-south axis, means for measuring the acceleration of the craft in an east-west direction, and means for levelling said frame about its north-south axis in accordance with the difference between the measurements of said tilt measuring device and acceleration measuring means.

18. In a gyroscopic instrument for dirigible craft, a gyroscopic rotor with an east-west spin axis having a frame supporting said rotor with freedom about an azimuth axis and a normally horizontal north-south axis, a gravitationally responsive device providing a limited signal in accordance with tilt of the frame from a level condition about its north-south axis, means for providing a signal in accordance with the acceleration of the craft in an east-west direction, means for mixing the signals of said tilt signal device and acceleration signal means subtractively, signal means providing a time integral measurement of the output of said mixing means, and means for levelling said frame about its north-south axis in accordance with the difference between the output of said mixing means and said time integral measuring signal means.

19. In a gyroscopic instrument for dirigible craft, a gyroscopic rotor with an east-west spin axis having a frame supporting said rotor with freedom about an azimuth axis and a normally horizontal north-south axis, means for levelling the frame about its north-south axis including means for exerting a torque about the azimuth axis of the frame, means for deriving a signal proportional to the horizontal component of the earth's rotation at the latitude of the craft, and means for operating said torquing means from said signal deriving means.

20. In a gyroscopic instrument for dirigible craft, a gyroscopic rotor with an east-west spin axis having a frame supporting said rotor with freedom about an azimuth axis and a normally horizontal north-south axis, gravity responsive means for levelling the frame about its north-south axis including means for exerting a torque about the azimuth axis of the frame, means for deriving a signal proportional to the earth's rotation and the cosine of the latitude of the craft, and means for operating said torque means from said signal deriving means.

21. In a gyroscopic instrument for dirigible craft, a gyroscopic rotor with an east-west spin axis having a frame supporting said rotor with freedom about an azimuth axis and a normally horizontal north-south axis, means for levelling the frame about its north-south axis including means for exerting a torque about the azimuth axis of the frame, means for deriving a signal in accordance with the speed and sine of the course of the craft, and means for operating said torquing means from said signal deriving means.

22. In a gyroscopic instrument for dirigible craft, a gyroscopic rotor with an east-west spin axis having a frame supporting said rotor with freedom about an azimuth axis and a normally horizontal north-south axis, gravity responsive means for levelling the frame about its north-south axis including means for exerting a torque about the azimuth axis of the frame, means for deriving a signal in accordance with the speed and sine of the course of the craft, and means for operating said torquing means from said signal deriving means.

23. In a gyroscopic instrument for dirigible craft, a gyroscopic rotor with an east-west spin axis having a frame supporting said rotor with freedom about an azimuth axis and a normally horizontal north-south axis, a gravity responsive device providing a limited signal in accordance with tilt of the frame from a level condition about its north-south axis, means for providing a signal in accordance with the acceleration of the craft in an east-west direction, means for mixing the signals of said tilt signal device and acceleration signal means subtractively, signal means providing a time integral measurement of the output of said mixing means, means for deriving a signal in accordance with the speed and sine of the course of the craft, means for providing a signal proportional to the earth's rotation and the cosine of the latitude of the craft, and means for levelling said frame about its north-south axis in accordance with the signals of said deriving and providing signal means and the difference between the signals of said mixing means and said time integral measuring signal means.

24. In an azimuth reference instrument for dirigible craft, a gyroscopic element, means supporting said gyroscopic element in neutral equilibrium with freedom about an azimuth axis and a normally horizontal east-west axis, means for exerting a meridian seeking torque about the horizontal axis of the element, means for exerting a damping torque about the azimuth axis of the element, means operatively connected to both of said torquing means including a gravity responsive device providing a torquing means operating signal in accordance with relative tilt between the element and supporting means about the horizontal axis, means for producing a signal proportional to the vertical component of the earth's rotation at the latitude of the craft, and means for correcting the torque exerted by said meridian seeking torque means in accordance with the signal of said earth's rotation signal producing means.

25. The combination claimed in claim 24 in which said gravity responsive device is a liquid level providing a limited substantially linear signal within a tilt range of plus or minus one-half a degree.

26. In an azimuth reference instrument for dirigible craft, a gyroscopic element, means supporting said gyroscopic element in neutral equilibrium with freedom about an azimuth axis and a normally horizontal east-west axis, means for exerting a meridian seeking torque about the horizontal axis of the element, means for exerting a damping torque about the azimuth axis of the element, means operatively connected to both said torquing means including a gravity responsive device providing a torquing means operating signal in accordance with relative tilt between the element and supporting means about the horizontal axis, means for producing a signal in accordance with the speed and course of the craft, means for producing a signal in accordance with the latitude of the craft, and means for correcting the torque exerted by said meridian seeking torque means in accordance with the signals of said speed and course signal producing means and said latitude signal producing means.

27. The combination claimed in claim 26, including means for producing a signal in accordance with the northerly drift of the craft, and said correcting means also includes the signal of said northerly drift signal means.

28. In an azimuth reference instrument for dirigible craft, a gyroscopic element, means supporting said gyroscopic element in neutral equilibrium with freedom about an azimuth axis and a normally horizontal east-west axis, means for exerting a meridian seeking torque about the horizontal axis of the element, means for exerting a damping torque about the azimuth axis of the element, means for operating both of said torquing means including a gravity responsive device providing a torquing means operating signal in accordance with relative tilt between the element and supporting means about the horizontal axis, means for producing a signal in accordance with the northerly component of the craft's velocity, and means for correcting the torque exerted by said damping torque means in accordance with the signal of said velocity signal means.

29. In an azimuth reference instrument for dirigible craft, a gyroscopic element, means supporting said gyroscopic element in neutral equilibrium with freedom about an azimuth axis and a normally horizontal east-west axis, means for exerting a meridian seeking torque about the horizontal axis of the element, means for exerting a damping torque about the azimuth axis of the element, means for operating both of said torquing means including a gravity responsive device providing a torquing means operating signal in accordance with relative tilt between the element and supporting means about the horizontal axis, means for producing a signal in accordance with the vertical component of the earth's rotation, means for producing a signal in accordance with the northerly component of the craft's velocity, means for correcting the torque exerted by the meridian seeking torque means in accordance with the signal of said earth's rotation signal means, and means for correcting the torque exerted by said damping torque means in accordance with the signal of said velocity signal means.

30. In an azimuth reference instrument for dirigible craft, a gyroscopic element, means supporting said gyroscopic element in neutral equilibrium with freedom about an azimuth axis and a normally horizontal east-west axis, means for exerting a meridian seeking torque about the horizontal axis of the element, means for exerting a damping torque about the azimuth axis of the element, and means for operating both of said torquing means including a liquid level device providing a limited substantially linear signal within a range of plus or minus one-half a degree of relative tilt between the element and supporting means about the horizontal axis, and means providing a signal in accordance with the acceleration of the craft in a north-south direction.

References Cited in the file of this patent

UNITED STATES PATENTS

| | | |
|---|---|---|
| 1,628,136 | Ford | May 10, 1927 |
| 1,834,341 | Henderson | Dec. 1, 1931 |
| 1,950,517 | Rawlings | Mar. 13, 1934 |
| 1,978,425 | Gillmor | Oct. 30, 1934 |
| 2,008,058 | Boykow | July 16, 1935 |
| 2,302,894 | Ross | Nov. 24, 1942 |
| 2,367,465 | Kunzer | Jan. 16, 1945 |
| 2,591,697 | Hays, Jr. | Apr. 8, 1952 |
| 2,597,151 | Konet | May 20, 1952 |